United States Patent
Butler, III et al.

(10) Patent No.: US 10,252,818 B2
(45) Date of Patent: Apr. 9, 2019

(54) OPTICAL VIEWING APPARATUS FOR AIRCRAFT DOORWAY

(71) Applicants: LEARJET INC., Wichita, KS (US); Harris K. Butler, III, Towanda, KS (US); Kris Rustman, Valley Center, KS (US)

(72) Inventors: Harris K. Butler, III, Towanda, KS (US); Kris Rustman, Valley Center, KS (US)

(73) Assignee: LEARJET INC., Wichita, KS (US)

( * ) Notice: Subject to any disclaimer, the term of this patent is extended or adjusted under 35 U.S.C. 154(b) by 211 days.

(21) Appl. No.: 14/441,413

(22) PCT Filed: Nov. 14, 2013

(86) PCT No.: PCT/US2013/070166
§ 371 (c)(1),
(2) Date: May 7, 2015

(87) PCT Pub. No.: WO2014/081614
PCT Pub. Date: May 30, 2014

(65) Prior Publication Data
US 2015/0307208 A1 Oct. 29, 2015

Related U.S. Application Data

(60) Provisional application No. 61/728,367, filed on Nov. 20, 2012.

(51) Int. Cl.
H04N 7/18 (2006.01)
B64D 47/08 (2006.01)
(Continued)

(52) U.S. Cl.
CPC ............ B64D 47/08 (2013.01); B64C 1/1407 (2013.01); B64D 45/00 (2013.01); G02B 23/08 (2013.01);
(Continued)

(58) Field of Classification Search
CPC .... B64D 43/00; B64D 45/0015; H04N 7/183; G07C 5/085; G01B 11/16
(Continued)

(56) References Cited

U.S. PATENT DOCUMENTS 4,261,284 A 4/1981 Simmons, Jr.
4,358,182 A 11/1982 Hayes et al.
(Continued)

FOREIGN PATENT DOCUMENTS

CN 1956018 A 5/2007
CN 201132606 Y 10/2008
(Continued)

OTHER PUBLICATIONS

Chinese Office Action dated Nov. 21, 2016, for Chinese Patent Application No. 201380060660.2.
(Continued)

*Primary Examiner* — Tung T Vo
(74) *Attorney, Agent, or Firm* — Karceski IP Law, PLLC

(57) ABSTRACT

A viewing device for an aircraft includes an image receiver adapted to receive an image of a predetermined spatial area of an exterior of an aircraft, an image projector adapted to display the image of the predetermined spatial area, and an image conduit connecting the image receiver to the image projector. The image receiver is adapted to be positioned on an exterior side of the aircraft below a lateral width of a fuselage of the aircraft while the image projector is adapted to be positioned on an interior side of the aircraft above the lateral width of the fuselage of the aircraft. The image
(Continued)

projector is adapted to be positioned at a first predetermined height above a floor on the interior side of the aircraft, consistent with a person's eye level. The image projector is separated from the image receiver by a first predetermined distance.

21 Claims, 8 Drawing Sheets

(51) Int. Cl.
    *B64C 1/14* (2006.01)
    *B64D 45/00* (2006.01)
    *G02B 23/08* (2006.01)
    *H04N 7/20* (2006.01)
    *G02B 6/06* (2006.01)

(52) U.S. Cl.
    CPC ............. *H04N 7/183* (2013.01); *H04N 7/186* (2013.01); *G02B 6/06* (2013.01)

(58) Field of Classification Search
    USPC ........................................................ 348/148
    See application file for complete search history.

(56) References Cited

U.S. PATENT DOCUMENTS

| | | | |
|---|---|---|---|
| 4,719,720 A | | 1/1988 | Olsen |
| 4,816,828 A | * | 3/1989 | Feher ..................... B64D 43/00 244/1 R |
| 4,843,461 A | | 6/1989 | Tatsumi et al. |
| 4,859,026 A | | 8/1989 | Arents |
| 5,426,891 A | | 6/1995 | Svehaug |
| 5,619,370 A | | 4/1997 | Guinosso |
| 5,786,935 A | | 7/1998 | Kanai et al. |
| 6,592,077 B2 | | 7/2003 | Uhlemann et al. |
| 6,864,805 B1 | * | 3/2005 | Gomez .............. B64D 45/0015 340/945 |
| 7,286,289 B2 | | 10/2007 | Bengoechea et al. |
| 7,677,494 B2 | | 3/2010 | Yada et al. |
| 8,033,505 B2 | | 10/2011 | Wieting |
| 9,234,813 B2 | * | 1/2016 | Reitmann ............... G01B 11/16 |
| 2007/0085907 A1 | * | 4/2007 | Beauregard ............ G07C 5/085 348/144 |
| 2009/0139039 A1 | * | 6/2009 | Saito ....................... B64F 1/305 14/71.1 |
| 2011/0139934 A1 | * | 6/2011 | Giesa ...................... B64D 25/14 244/137.2 |

FOREIGN PATENT DOCUMENTS

| | | |
|---|---|---|
| EP | 0980828 A1 | 2/2000 |
| EP | 2495168 A1 | 9/2012 |
| GB | 536352 | 5/1941 |

OTHER PUBLICATIONS

Chinese Office Action dated Mar. 4, 2016, for Chinese Patent Application No. 201380060660.2.

International Search Report and Written Opinion dated Jan. 22, 2014, for International Patent Application No. PCT/US2013/070166.

International Prelminary Report on Patentability, dated Jun. 4, 2015, for International Patent Application No. PCT/US2013/070166.

Chinese Office Action dated Jul. 4, 2017, for Chinese Patent Application No. 2013800606060.2.

European Office Action dated May 28, 2018, for European Patent Application No. 13802770.1.

\* cited by examiner

OPTICAL VIEWING APPARATUS FOR AIRCRAFT DOORWAY

CROSS-REFERENCE TO RELATED APPLICATION(S)

This is U.S. National Stage Patent Application of International Patent Application No. PCT/US2013/070166, filed Nov. 14, 2013, which relies for priority on U.S. Provisional Patent Application No. 61/728,367, filed on Nov. 20, 2012, the entire contents of both of which are hereby incorporated by reference.

FIELD OF THE INVENTION

The present invention concerns the construction and operation of an optical viewing device for an aircraft to allow viewing of an outside area of the aircraft from an inside of the aircraft. In one embodiment, the present invention concerns a device that incorporates an optical conduit, permitting occupants of an aircraft to view an area exterior to a door, such as a passenger door.

DESCRIPTION OF THE RELATED ART

The prior art includes several examples of devices that facilitate viewing of an area exterior to the aircraft door.

For example, U.S. Pat. No. 4,358,182 (hereinafter "the '182 Patent") describes a composite window that extends through a door 10 of an aircraft. (The '182 Patent at col. 2, lines 35-37.) The door may be a forward or aft entrance door for a passenger aircraft. (The '182 Patent at col. 2, line 36.) The composite window includes an outer pane 11 and an inner pane 14. (The '182 Patent at col. 2, lines 41-46.) The inner pane 14 is formed in the shape of a prism 16, which permits the passenger to view the area exterior to the passenger door 10. (The '182 Patent at col. 2, lines 54-57.)

In addition, U.S. Pat. No. 6,592,077 (hereinafter "the '077 Patent") describes a construction for a window for an aircraft door. The window includes a Fresnel lens on an intermediate pane 3 between an inner pane 2 and an outer pane 2. (The '077 Patent at col. 4, lines 40-45.) Specifically, the Fresnel lens provides an expended field of view in the manner of a fish eye lens. (The '077 Patent at col. 4, lines 40-45.)

U.S. Pat. No. 8,033,505 (hereinafter "the '505 Patent") also describes an airplane door window that includes an optical lens, such as a Fresnel lens 14, between an inner and out pane 4, 6. (The '505 Patent at col. 2, lines 53-60.)

In a different arrangement, it is known to provide a window in the door of the aircraft and configure the associated stairs in a manner to leave the window uncovered when the door is closed. U.S. Pat. No. 7,677,494 (hereinafter "the '494 Patent") describes one such construction.

Optical viewing devices also are known for doors, such as doors for a dwelling. Such viewing devices commonly include optics referred to as "fisheye" lenses. The lenses are exposed to the exterior of a door so that a person may observer visitors before opening the door.

U.S. Pat. No. 4,719,720 (hereinafter "the '720 Patent") describes one type of viewing port for a door to a residence. The viewing port includes polarizing filters to control the amount of light entering the viewing port. (The '720 Patent at col. 1, lines 46-53.)

U.S. Pat. No. 5,426,891 (hereinafter "the '891 Patent") describes a door knocker with an invisible lenticular breast plate. The viewing hole is hidden so that a visitor is not made aware of the fact that he or she is being observed. (The '891 Patent at col. 2, lines 1-4.)

U.S. Pat. No. 5,786,935 (hereinafter "the '935 Patent") describes a scope attached to a door that permits a person to view a visitor to a house or apartment. (The '935 Patent at col. 1, lines 12-18.) The scope includes an optical system with a number of lenses that provide a wide field of view and a clear image. (The '935 Patent at col. 1, 53-55.)

There remains, however, an absence of any device that permits viewing of an area exterior to a passenger door of an aircraft, specifically a passenger door with stairs incorporated therein (or thereon).

SUMMARY OF THE INVENTION

The present invention addresses one or more deficiencies associated with windows and/or observation ports that have been provided in the prior art.

The present invention provides, among other things, a viewing device that permits observation of a specified area exterior to an aircraft.

In one embodiment, the present invention concerns a viewing device for an aircraft that includes an image receiver adapted to receive an image of a predetermined spatial area of an exterior of an aircraft, an image projector adapted to display the image of the predetermined spatial area, and an image conduit connecting the image receiver to the image projector, thereby conveying the image of the predetermined spatial area from the image receiver to the image projector. The image receiver is adapted to be positioned on an exterior side of the aircraft below a lateral width of a fuselage of the aircraft. The image projector is adapted to be positioned on an interior side of the aircraft above the lateral width of the fuselage of the aircraft. The image projector is adapted to be positioned at a first predetermined height above a floor on the interior side of the aircraft. The first predetermined height is consistent with a person's eye level when the person is in an upright position. The image projector is separated from the image receiver by a first predetermined distance.

In another contemplated embodiment, the predetermined spatial area is located exteriorly to a door of the aircraft. Still further, it is contemplated that the predetermined spatial area may be at least partially occupied by the door of the aircraft when the door is in an opened position.

It is also contemplated that the image receiver is adapted to be positioned on an exterior side of a door of the aircraft. Furthermore, the image projector may be adapted to be positioned in a vicinity of an interior of the door of the aircraft thereby allowing a person to activate an opening mechanism of the door of the aircraft while viewing the predetermined spatial area through the image projector.

In one contemplated embodiment, the image receiver, image projector, and image conduit are passive. In this embodiment, it is contemplated that the image receiver is a light-receiving aperture. Moreover, it is contemplated that the image projector is an eye piece and the image conduit is an optical conduit.

In another contemplated embodiment, the image receiver, the image projector, and the image conduit are powered. Here, the image receiver may be a digital camera, the image projector may be a display, and the image conduit may be an electrical cable.

It is contemplated that the first predetermined height may be within a range between about 50 to 80 inches. Alternatively, the first predetermined height may be within a range between about 55 to 75 inches, between about 60 to 70 inches, or about 65 inches.

Still further, it is contemplated that the first predetermined distance may be within a range of less than about 6 feet, less than about 5 feet, less than about 4 feet, less than about 3 feet, less than about 2 feet, or less than about 1 foot.

Still further features of the present invention should be appreciated from the drawings appended hereto and from the discussion herein.

BRIEF DESCRIPTION OF THE DRAWINGS

The present invention will now be described in connection with the drawings appended hereto, in which.

DETAILED DESCRIPTION OF EMBODIMENT(S) OF THE INVENTION

The present invention will now be described in connection with one or more embodiments. Discussion of any one particular embodiment is intended to be illustrative of the breadth and scope of the invention. In other words, while attention is focused on specific embodiments, those embodiments are not intended to be limiting of the scope of the present invention. To the contrary, after appreciating the discussion and drawings presented herein, those skilled in the art will readily appreciate one or more variations and equivalents of the embodiments described and illustrated. Those variations and equivalents are intended to be encompassed by the present invention as though they were described herein.

As a point of convention, as should be understood by those skilled in the art, an aircraft includes a front end and a rear end that define a longitudinal axis. The wings, which extend outwardly from the fuselage of the aircraft, define a lateral axis. In the discussion that follows, therefore, reference to a longitudinal axis is intended to refer to an axis parallel to the longitudinal axis of the aircraft. Similarly, reference to a lateral axis is intended to refer to an axis that is parallel to the lateral axis of the aircraft.

As another point of convention, the terms "front," "rear" or "aft," "right," "left," "starboard," and "port" are intended to refer to directions that are consistent with the direction of travel of a conventional aircraft. The use of these conventions, however, is not intended to be limiting of the present invention. To the contrary, these terms are used merely to facilitate discussion of the considerable breadth and scope of the present invention.

Throughout the discussion that follows, the present invention will be discussed in connection with an aircraft. While the discussion of the present invention focuses on an aircraft, the present invention should not be considered as being limited to an aircraft. To the contrary, the present invention may be applied to any other mode of transportation, including railway cars or other transportation and cargo vehicles, as should be appreciated by those skilled in the art.

Figure 1:
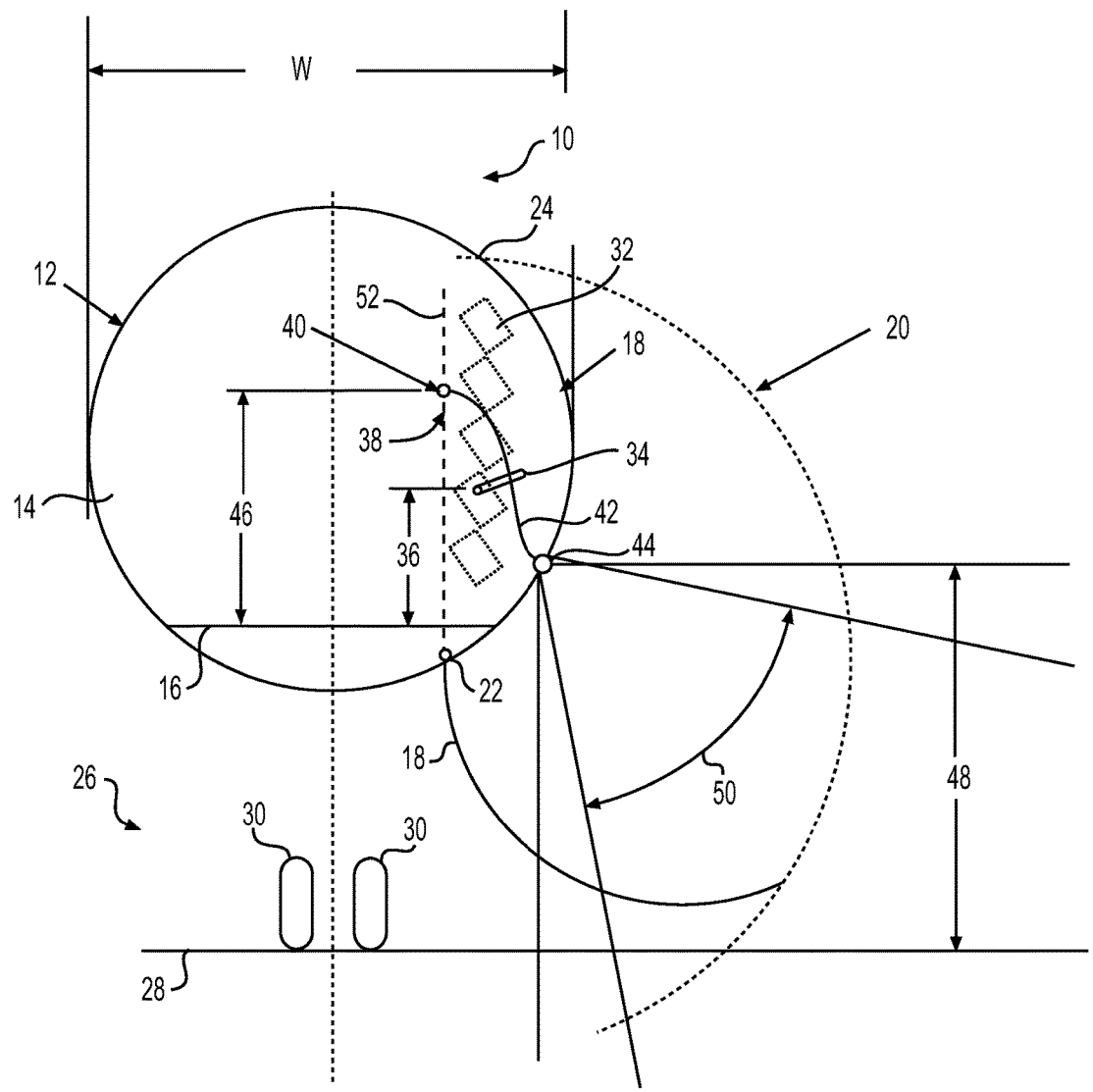
FIG. 1 is a graphical illustration of a cross sectional view of an aircraft incorporating the viewing apparatus of the present invention.

According to one or more embodiments of the present invention, FIG. 1 is a graphical illustration of an aircraft 10. The view is taken from the perspective of an observer standing at the front of the aircraft 10, looking toward the rear of the aircraft 10. In other words, the perspective is along the longitudinal axis of the aircraft 10, facing aft.

The aircraft 10 includes a fuselage 12, which is defined by the exterior skin of the aircraft 10. The term "fuselage" 12 is typically used to refer to the portion of the aircraft 10 that carries passengers and/or cargo. The exterior skin of the fuselage 12 also is referred to as the outside mold line or the outside skin line of the aircraft 10. The fuselage 12 defines the main body exterior dimensions of the aircraft 10 along its longitudinal axis. In the illustrated example, the interior of the fuselage 12 defines a passenger cabin 14 having a floor 16. The passenger cabin 14 may also function as a cargo space or a hybrid cargo space and passenger cabin without departing from the scope of the present invention. In other words, the present invention is not intended to be limited solely to aircraft 10 designed to ferry passengers.

As illustrated for the aircraft 10, the fuselage 12 includes a door 18 that opens in a downward manner along an arc 20. At its lowest point, the door 18 connects to the fuselage 12 via a door hinge 22. At its highest point, the door 18 mates with a top door frame 24, when closed.

The type of aircraft 10 illustrated is considered to be a type of small jet, such as a small passenger or private jet. Examples of this type of aircraft 10 include the type of aircraft 10 manufactured by Lear Jet, Inc. of Wichita, Kans. This type of aircraft 10 also may be a passenger jet, such as a CRJ or a Global, which is manufactured by Bombardier Inc. of Montreal, Canada. Still other airplane types that incorporate doors 18 opening in a downward fashion (as illustrated in FIG. 1) are intended to be encompassed by the present invention.

It is noted that, while the present invention is described in connection with aircraft 10 with doors 18 opening in a downward fashion along an arc 20, the present invention may be applied equally to other aircraft types where the door opens laterally or pivots upwardly. In other words, the present invention is not intended to be limited solely to aircraft 10 with doors 18 that open downwardly along an arc 20.

For context, FIG. 1 illustrates the front landing gear 26 beneath the nose of the aircraft 10. The front landing gear 26 is shown positioned on a surface, such as the ground 28. The front landing gear includes two tires 30 in this illustration.

As should be apparent from the illustration, the door 18 includes a set of stairs 32 incorporated therein. The stairs 32, which are shown in the orientation that would occur when the door 18 is closed, facilitate passenger ingress and egress from the aircraft 10. The door 18 also includes a release/locking latch 34 that permits the door to be secured when closed and to be opened when passengers are entering or exiting the aircraft 10. As illustrated, the latch 34 is positioned at a suitable height 36 above the floor 16 of the passenger cabin 14. The height 36 is selected for the average adult person to reach and activate the latch 34, as required or as desired.

One difficulty that is associated with doors 18 of the type illustrated in FIG. 1 is that there is no location where a convenient peep hole or viewing porthole may be disposed in the door 18 itself. As should be apparent to those skilled in the art, the majority of the interior surface of the type of door 18 shown is covered with the stairs 32. An additional difficulty lies in the construction of the interior of the door 18 itself. So that the door 18 may be secured when in the closed position, there are a number of mechanisms internal to the door 18 that assure a tight-fitting seal between the door 18 and the fuselage 12. As a result, there is little room within the door 18 through which a port hole or other viewing window may be disposed.

The present invention provides a viewing device 38 that permits a person (such as a passenger or a flight attendant) within the cabin 14 of the aircraft 10 to view an area exterior to the aircraft 10. Specifically, the viewing device 38 (or viewing apparatus 38) includes an interior eye piece 40 that is connected, via an optical conduit 42 (which is also referred to as an optical pipe 42 herein), to an exterior aperture 44. In this regard, it is noted that the viewing device 38 of the present invention may be employed in other environments with similar physical constraints. For example, the viewing apparatus 38 may be positioned beside a door in the main structure of a vehicle, building, tank, ship, railway car, etc. In other words, the present invention may find wide applicability in other environments aside from aircraft 10.

With continued reference to FIG. 1, the eye piece 40 is positioned at a predetermined height 46 above the floor 16, which includes any suitable distance, as should be apparent from the discussion that follows. The aperture 44, which is on the fuselage 12 of the aircraft 10, is disposed at a predetermined height 48 above the ground 28. In the illustrated embodiment, the aperture 44 is positioned below the eye piece 40.

The aperture 44 permits viewing of an area of predetermined size exterior to the aircraft 10. Specifically, the aperture 44 permits viewing of an area outside of the aircraft 10 through a field of view defined by a viewing angle 50. While the viewing angle 50 is defined as an angle less than 90°, at least with respect to the embodiment illustrated in FIG. 1, the viewing angle 50 may be larger or smaller without departing from the scope of the present invention.

As a point of reference, the viewing angle 50 illustrated in FIG. 1 is approximately 70°. While this viewing angle has been selected for the illustrated embodiment, the viewing angle 50 may lie in a range between about 65° to 75°. In a further contemplated embodiment, the viewing angle 50 may lie in a range between about 60° and 80°. Still further, it is contemplated that the viewing angle 50 may lie in a range between about 55° and 85°. Without limiting the present invention, in a further contemplated embodiment, the viewing angle may lie in a range between about 50° and 90°.

It is noted that the eye piece 40 lies in the same vertical plane 52 as the door hinge 22. This orientation is presented as one contemplated embodiment of the present invention. It is also contemplated that the eye piece 40 and the door hinge 22 will not lie on the same vertical plane 52. In other words, the eye piece 40 and the hinge 22 need not lie on the same vertical plane 52 to practice the present invention.

As noted above, the viewing device 38 of the present invention is intended to provide a person, standing on the floor 16 of the cabin 14, to examine the area within the viewing angle 50 immediately outside of the door 18. There are several reasons why a person standing in the cabin 14 might want to view the area immediately outside of the door 18. If the aircraft 10 is at an airport, for example, a flight attendant may wish to verify that there are no people present near to the door 18 before opening the door 18. Naturally, this would help to avoid injury of any ground crew personnel that may be present to service the aircraft 10. In addition, in an emergency, it is necessary to assess the conditions at the exterior of the aircraft 10 before opening the door 18. For example, it is necessary to assess if the area immediately outside of the door 18 is accessible (e.g., free from debris, obstructions, hazards, or fire) before the door 18 is opened.

The viewing device 38 of the present invention permits a person standing next to the door 18 to visually assess the conditions present within the area immediately adjacent to the door 18. More specifically, the viewing device 38 is arranged within the aircraft 10 in a manner so that the person may view the area within the viewing angle 50 and simultaneously actuate the door latch 34 to open the door 18 to the aircraft. In other words, the person opening the door 18 may do so while maintaining visual contact with the area immediately outside of the door 18.

As should be apparent from FIG. 1, and as will be made more apparent in the discussion that follows, the eye piece 40 for the optical device 38 is positioned above the exterior aperture 44. It is contemplated that the exterior aperture 44 will be located at a position adjacent to the door 18, at a location above the door hinge 22. Specifically, the exterior aperture 44 is contemplated to lie immediately adjacent to one of the forward or aft sides of the opening in the fuselage 12 that accommodates the door 18. The present invention, however, is not limited to this arrangement.

The positioning of the aperture 44 assists with a visual assessment of the area immediately outside of the door 18. As is apparent from FIG. 1, the curvature of the fuselage 12 presents a visual obstruction, preventing a person looking through a window, for example, to assess the entirety of the area immediately adjacent to the door 18. As illustrated, the eye piece 40 is at a height 46 that places it above the lateral width W of the fuselage 12. The aperture 44 is positioned below the lateral width W of the fuselage 12, which affords a view of the area exterior to the aircraft door 18.

With respect to the lateral width W of the aircraft 10, it is contemplated that the lateral width W will be the maximum lateral dimension of the fuselage 12 of the aircraft 12. Since the fuselage 12 of an aircraft 10 is generally circular in cross-section, the lateral width W is approximate to the diameter of the fuselage 12. Of course, the present invention is not intended to be limited solely to aircraft 10 with cylindrically-shaped fuselages 12. To the contrary, the present invention may be applied to aircraft 10 with non-circular cross-sections, as should be apparent to those skilled in the art.

Figure 2:
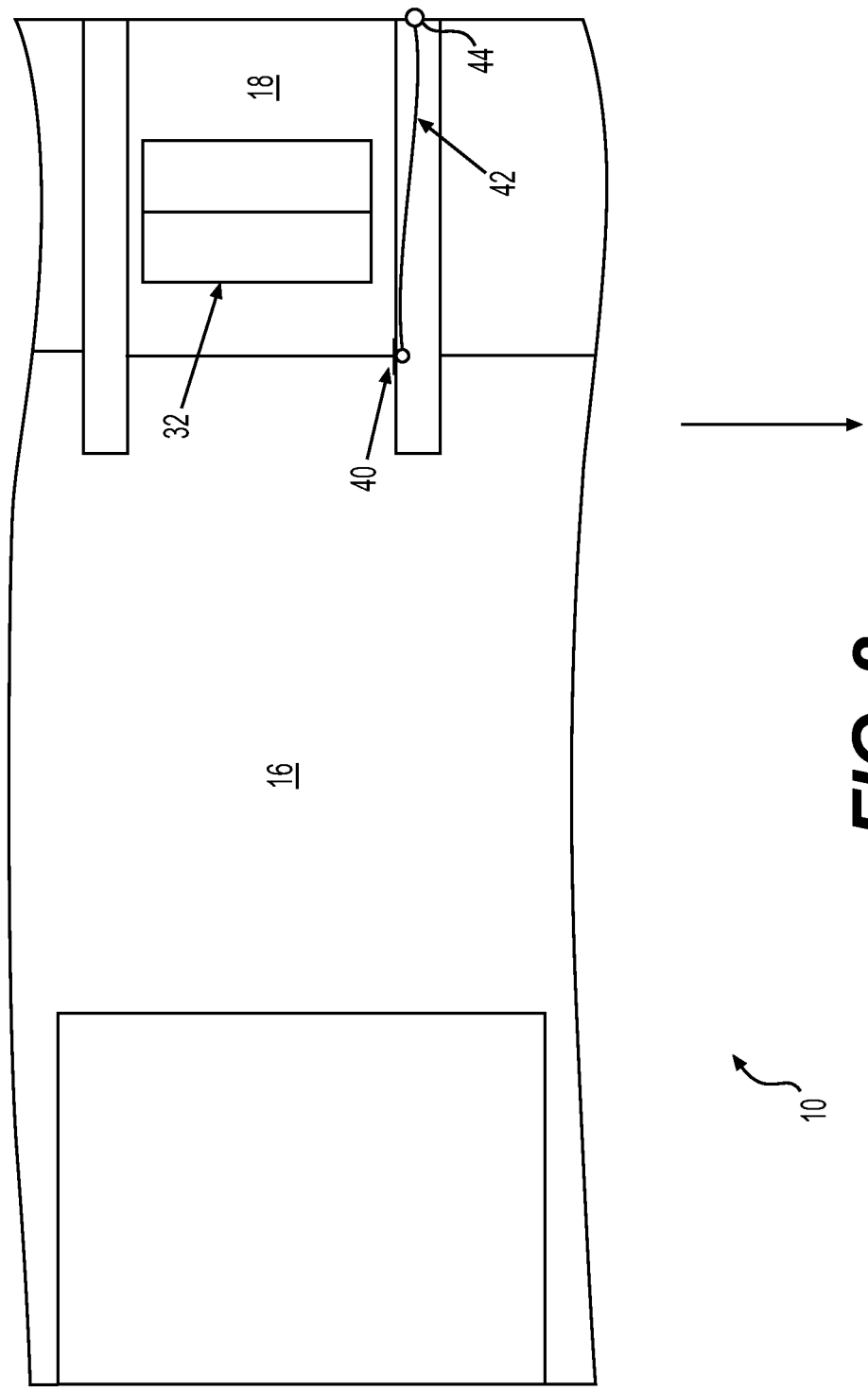
FIG. 2 is a graphical top view of the viewing apparatus illustrated in FIG. 1.

FIG. 2 is a top view of the viewing device 38 of the present invention. FIG. 2 illustrates one contemplated location for the viewing device 38. Specifically, the viewing device 38 is positioned in a bulkhead (or other structural feature of the cabin 14 of the aircraft 10) forward of the door 18. This placement has been selected for the illustrated embodiment, because it is considered to be easier for a right-handed person to release the latch 34 with his or her right hand while simultaneously looking through the eye piece 40. Naturally, the viewing device 38 may be positioned aft of the door 18 without departing from the scope of the present invention.

Figure 3:
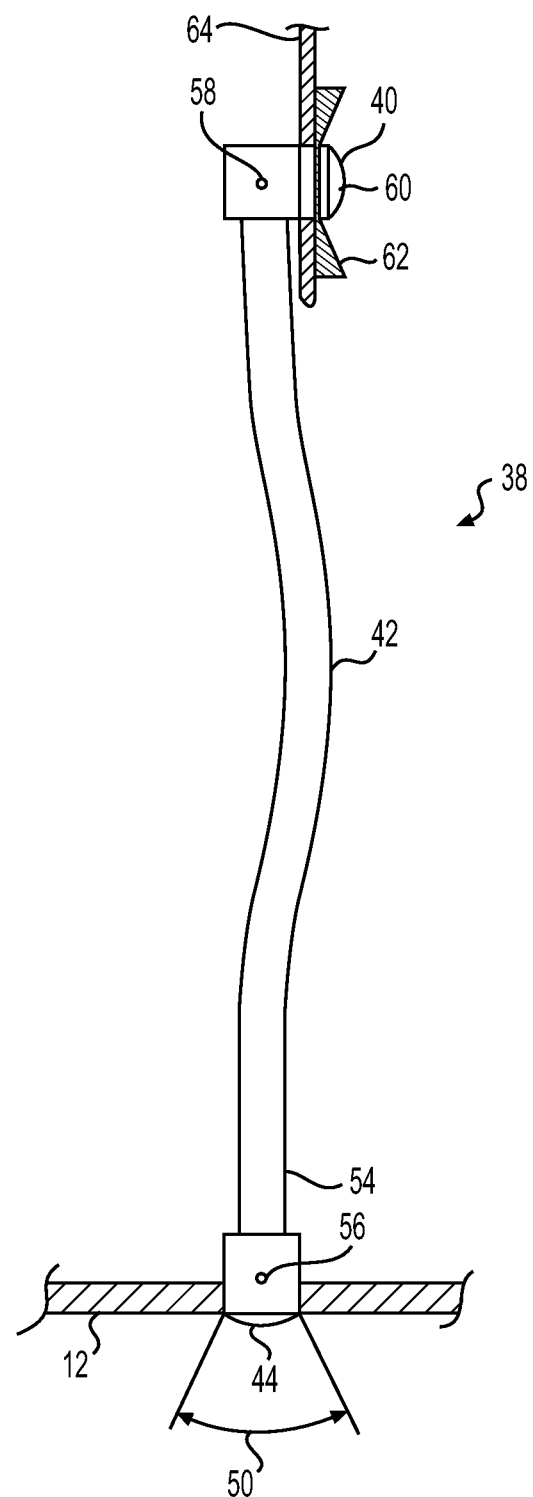
FIG. 3 is a graphical side view of one contemplated embodiment of the viewing apparatus of the present invention.

FIG. 3 is a graphical, side view of the viewing device 38 of the present invention. As noted above, the viewing device 38 has three primary components: (1) the eye piece 40, (2) the optical conduit 42, and (3) the exterior aperture 44.

The exterior aperture 44 is contemplated to be an opening in the fuselage 12 of the aircraft 10 to which the distal end 54 of the optical conduit 42 connects. Similarly, the eye piece 40 may be nothing more than an opening permitting a person to look into the optical conduit 42. As should be apparent to those skilled in the art, however, some lenses and/or other optical components may be incorporated into the viewing device 38 to improve the optical and/or operational characteristics of the viewing device 38.

With respect to FIG. 3, it is contemplated that the external aperture 44 of the viewing device 38 will be included in (and/or defined by) an external (or distal) lens housing 56. It is contemplated that one or more lenses (not shown) may be disposed within the distal lens housing 56 to establish the viewing angle 50 encompassing a predetermined area exterior to the door 18. The nature, size, composition, and positioning of the lenses is not critical to the operation of the viewing device 38 of the present invention. To the contrary, as should be apparent to those skilled in the art, any number of lenses and lens types may be employed for the viewing device 38 of the present invention.

With respect to the distal lens housing 56, other optical components may be disposed therein without departing from the scope of the present invention. For example, the distal lens housing 56 may include one or more prisms, light filters, etc. If employed, filters include, but are not limited to, polarizing filters, color filters, etc. The optical components are contemplated to be selected based on the operational requirements for the viewing device 38.

The viewing device 38 also is contemplated to include a proximal lens housing 58 adjacent to the eye piece 40. As with the distal lens housing 56, the proximal lens housing 58 is contemplated to include one or more lenses, filters, and/or prisms that may be considered appropriate for the viewing device 38. As with the distal lens housing 56, the optical components included in the proximal lens housing 58 are contemplated to components that are selected to meet operational requirements for the viewing device 38.

As illustrated in FIG. 3, the eye piece 40 connects to (or is incorporated in) the proximal lens housing 58. The eyepiece 40 includes a lens 60 that is surrounded by a flange 62. The lens 60 cooperates with the optical components (not shown) within the proximal lens housing 58 (if present) to direct light, in the form of an image, from the exterior of the aircraft 10 to the observer's eye. The flange 62 is contemplated to help affix the eye piece 40 to the interior wall 64 of the aircraft. A similar flange may be employed at the distal end 54 of the viewing device 38 to affix the exterior aperture 40 to the fuselage 12.

The optical conduit 42 may be made from any suitable light-conductive material. Contemplated materials include glass, plastic, polycarbonate, acrylic, and any of a number of composite materials. The precise composition of the optical conduit 42 is not critical to operation of the viewing device 38 of the present invention.

It is contemplated that the optical conduit 42 will be no more than about 5-6 feet (152.4-182.88 cm) long. This range of lengths is considered to be the maximum length that may be employed in a passive system, i.e., a system that does not have a separate light source. Due to optical losses that are contemplated to occur in the viewing device 38, it is contemplated that the eye piece 40 and the exterior aperture 44 will probably be no more than 6 feet (182.88 cm) from one another in a passive system. As should be apparent, a distance shorter than 6 feet (182.88 cm) is very practical and is contemplated to fall within the scope of the present invention.

In connection with the contemplated maximum distance of about 6 feet (182.88 cm) for the optical conduit 42, it is contemplated that the length of the optical conduit 42 will lie within a range of less than about 6 feet (182.88 cm). In another contemplated embodiment, the length of the optical conduit 42 lies within a range of less than about 5 feet (152.4 cm). Further, the present invention contemplated that the optical conduit may have a length that lies in a range of less than about 4 feet (121.92 cm). Also, one contemplated embodiment of the present invention encompasses an optical conduit 42 with a length within a range of less than about 3 feet (91.44 cm). In addition, it is contemplated that the optical conduit 42 may have a length that lies in a range of less than about 2 feet (60.96 cm). Finally, the present invention also contemplates that the optical conduit may have a length that lies in a range of less than 1 foot (30.48 cm). The lower limit for each of these ranges is considered to be zero feet (0 cm), as should be apparent to those skilled in the art.

Before continuing with a discussion of the present invention, it is noted that the design parameters of the present invention were created, taking into account a $99^{th}$ percentile male, a $50^{th}$ percentile male, and a $1^{st}$ percentile male, among other design parameters. By way of definition, a $99^{th}$ percentile male is a male person that meets the physical characteristics of an average male within the $99^{th}$ percentile of the human population, with respect to physical dimensions. The $99^{th}$ percentile male (as with the other percentile males), therefore, is a mathematical construct that is employed by designers, as should be apparent to those skilled in the art. Since this construct is a known design tool, a detailed definition of the construct is not provided herein.

In connection with the $99^{th}$, $50^{th}$, and $1^{st}$ percentile males, reference is made to a publication by Henry Dreyfuss Associates, entitled "The Measure of Man & Woman: Human Factors in Design" (2001). That publication (including subsequent editions) is incorporated herein by reference to provide support for any body type, including each of the male variants discussed herein. This definition is not intended to be limiting of the present invention, as the design standards are understood to change over time. However, this publication provides a convenient reference for those wishing to comprehend design parameters associated with (or in reference to) the human body.

Figure 4:
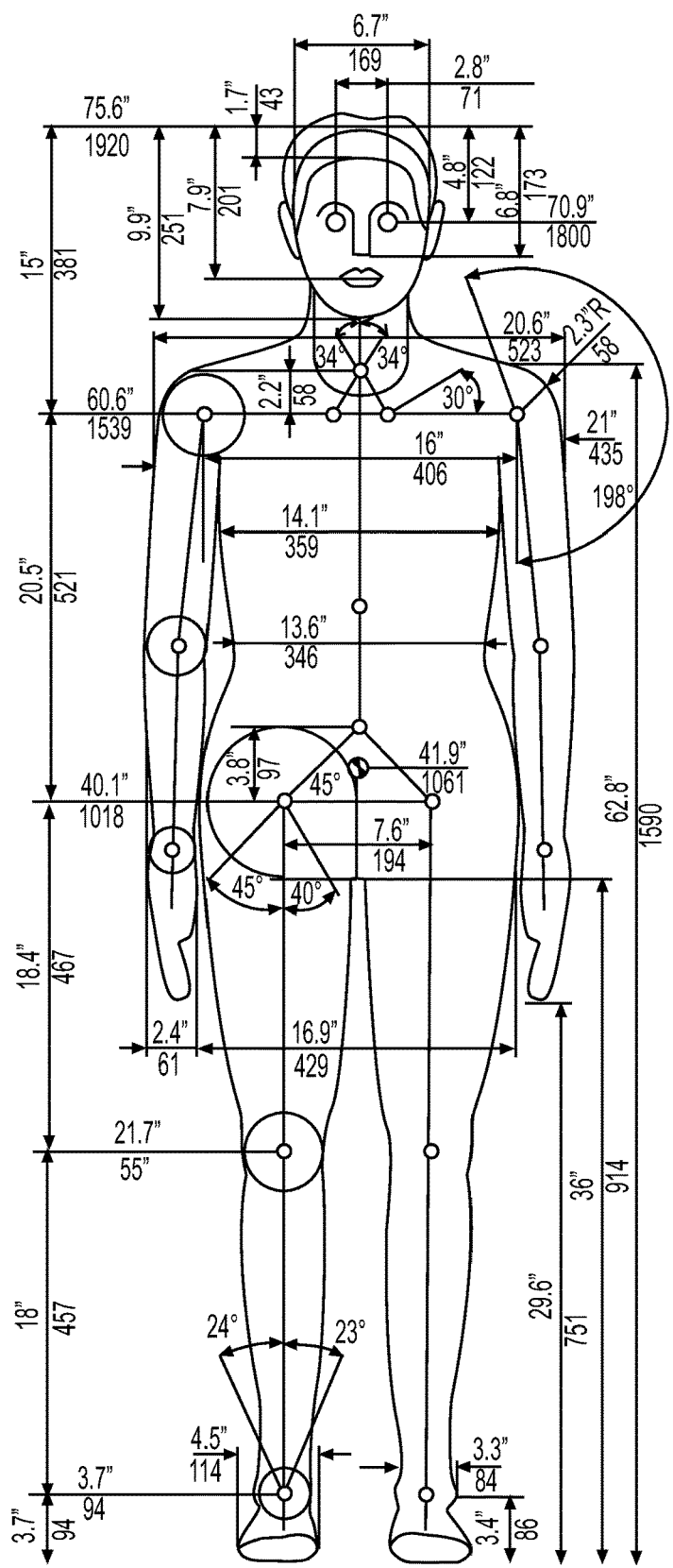
FIG. 4 is a graphical representation of a mathematical construct for a $99^{th}$ percentile male.
Figure 5:
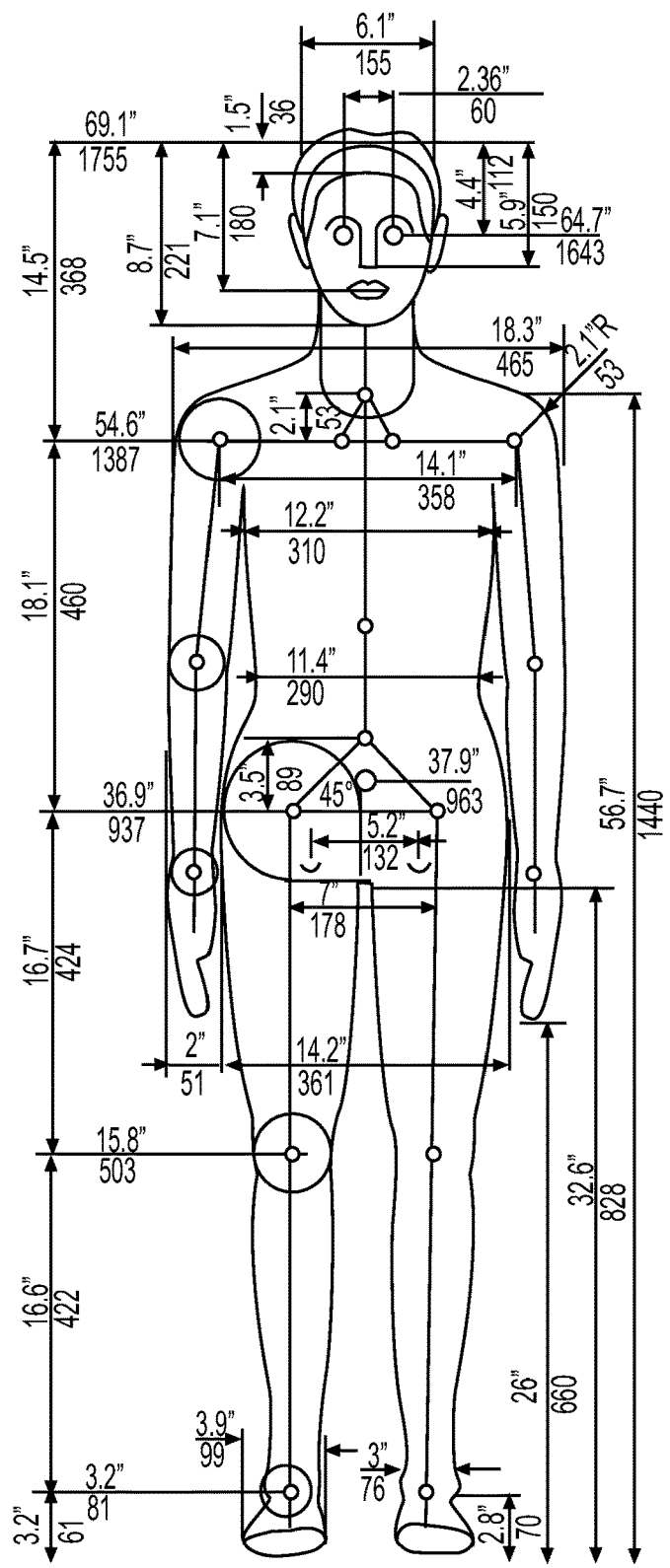
FIG. 5 is a graphical representation of a mathematical construct for a $50^{th}$ percentile male.
Figure 6:
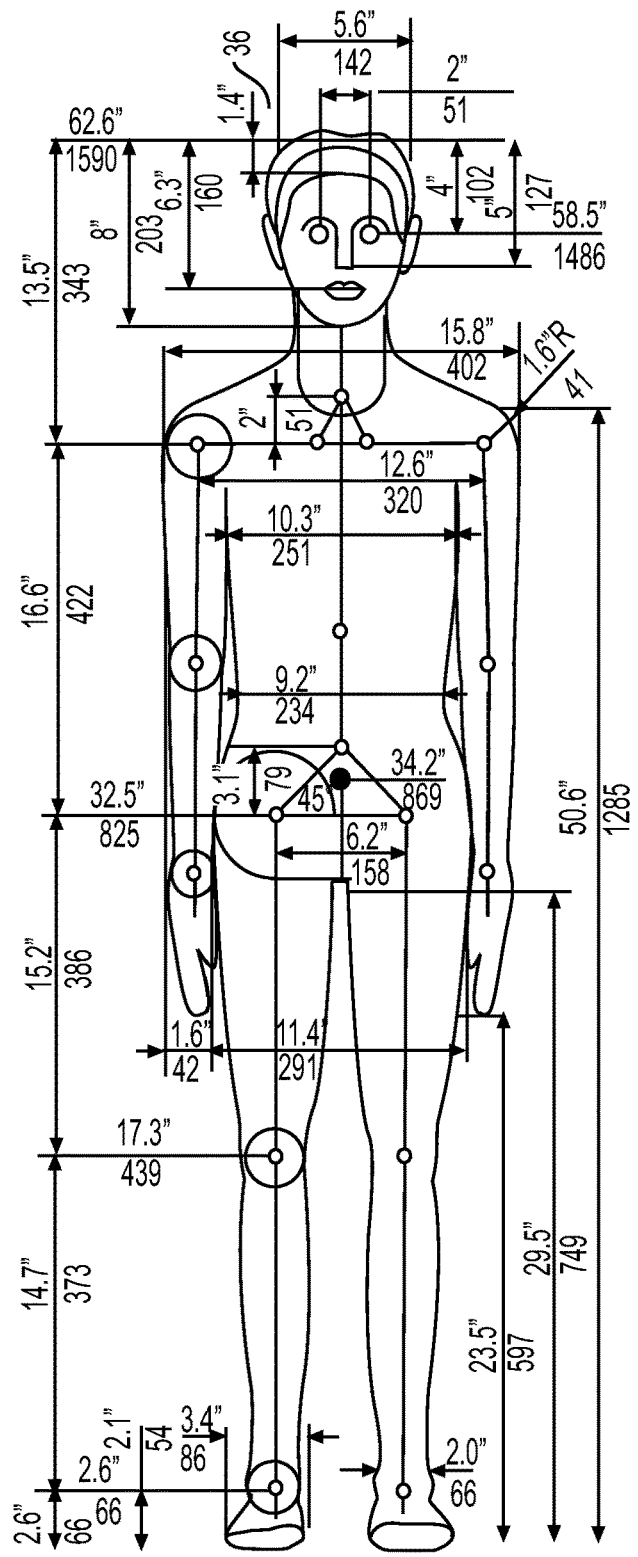
FIG. 6 is a graphical representation of a mathematical construct for a $1^{st}$ percentile male.

FIGS. 4-6 provide front views of the $99^{th}$ percentile male, the $50^{th}$ percentile male, and the $1^{st}$ percentile male. Eye level for the $99^{th}$ percentile male is 70.9 inches (180.0 cm) from the bottom of the person's feet. Eye level for the $50^{th}$ percentile male is 64.7 inches (164.3 cm). Eye level for the $E^t$ percentile male is 58.5 inches (148.6 cm) from the floor.

The height associated with the eye level for each of these constructs for a male person assists with determining a location for the eye piece 40. In one embodiment, it is contemplated that the height 46 of the eye piece 40 will be between about 50-80 inches (127.0-203.2 cm) from the floor 16. In another contemplated embodiment, the height 46 is between about 55-75 inches (139.7-190.5 cm) from the floor 16. In still another contemplated embodiment, the height 46 of the eye piece 40 from the floor 16 is between about 60-70 inches (152.4-177.8 cm). Consistent with the $50^{th}$ percentile male, the height 46 of the eye piece 40 is contemplated to be about 65 inches (165.1 cm) above the floor 16. As should be apparent, the height 46 of the eye piece 40 may be varied depending upon the design of the aircraft 10 and space considerations, among other factors that should be apparent to those skilled in the art.

Figure 7:
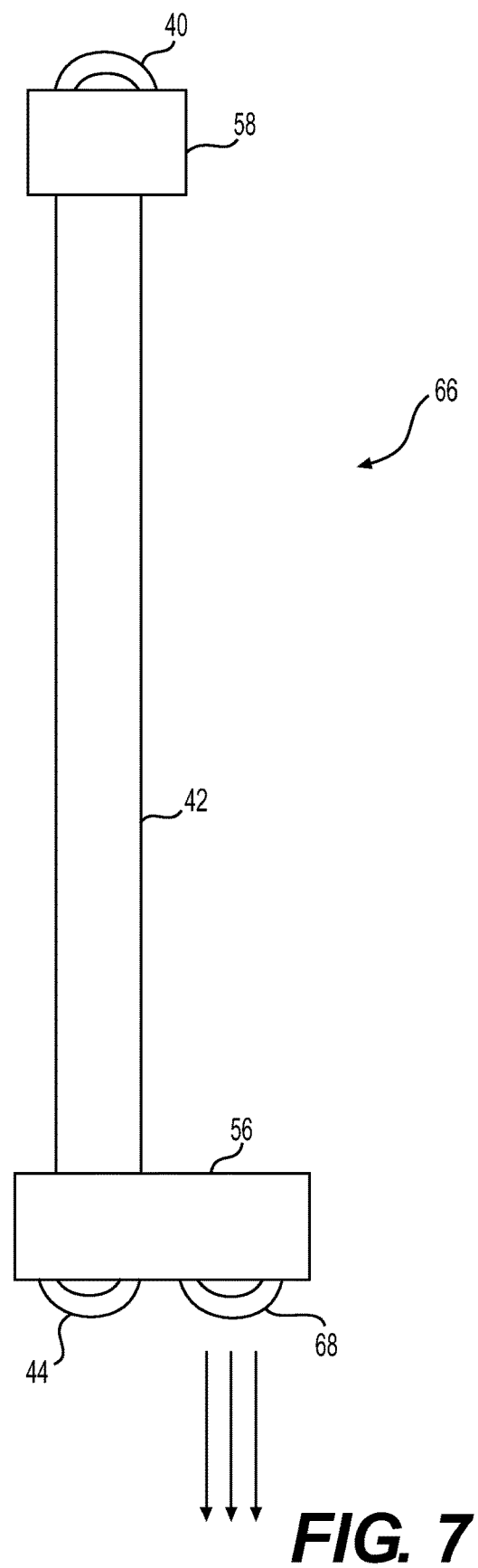
FIG. 7 is a graphical representation of a second embodiment of the viewing apparatus of the present invention.

FIG. 7 is a schematic illustration of a second contemplated embodiment of the present invention. Here, the viewing device 66 includes an artificial light source 68 that is incorporated into the distal lens housing 56. In this embodiment, the artificial light source 68 is positioned adjacent to the exterior aperture 44. The artificial light source 68 may be provided by any of a number of different light emitters including incandescent light bulbs, fluorescent light bulbs, light emitting diodes ("LEDs"), luminescent materials, etc. Where the artificial light source 68 is provided by a bulb requiring electrical power, it is contemplated that the light bulb will be connected to battery back-up power so that the light may be activated should power to the aircraft 10 be lost in its entirety.

As should be apparent, the artificial light source 68 need not be incorporated into the distal lens housing 56. To the contrary, the artificial light source 68 may be independent from the remaining components of the viewing device 66.

In a variation of the embodiment illustrated in FIG. 7, it is contemplated that the artificial light may be introduced into the optical conduit 42 at some intermediate position between the distal lens housing 56 and the proximal lens housing 58. In this contemplated embodiment, the optical conduit 42 conveys the light to the area outside of the door 18 within the viewing angle 50. The light conduit 42 also conveys the image from the aperture 44 to the eye piece 40.

Figure 8:
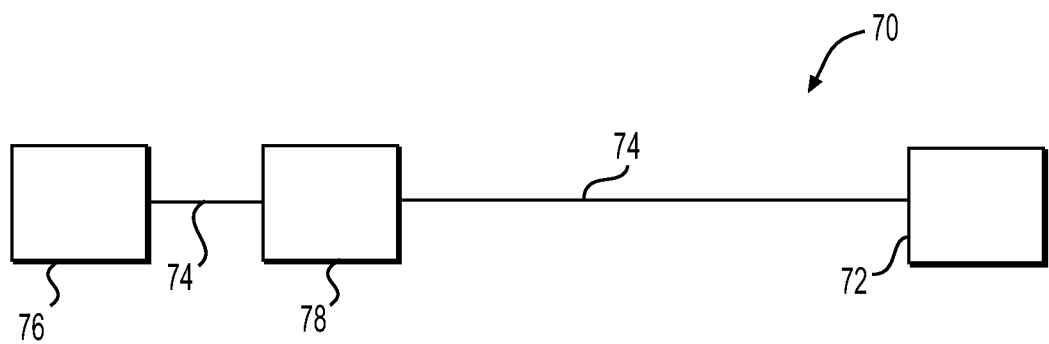
FIG. 8 is a graphical representation of a third embodiment of the viewing apparatus of the present invention.

FIG. 8 is a graphical illustration of a third embodiment of the present invention. In this embodiment, the viewing device 70 includes a camera 72, a connector 74, and a display 76. This third embodiment may also include a signal processor 78 between the camera 72 and the display 76 to assist with processing of the image captured (i.e., a digital image) by the camera 72.

In this embodiment, the viewing device 70 is powered. In other words, the viewing device will not operate unless connected to an electrical power source. In this embodiment, the camera 72 is affixed to the fuselage 12 so that the camera 72 may view the area exterior to the door 18. The image captured by the camera 72 is then transmitted along the connector 74 to the display 76, which is contemplated to be affixed to an interior wall within the cabin 14 of the aircraft 10.

In the embodiment of the viewing device 70 illustrated in FIG. 8, it is contemplated that the camera 72 is a digital camera 72. Of course, the camera need not generate a digital image. Instead, the camera 72 may generate any other type of image that may be transmitted to the display 76.

Figure 9:
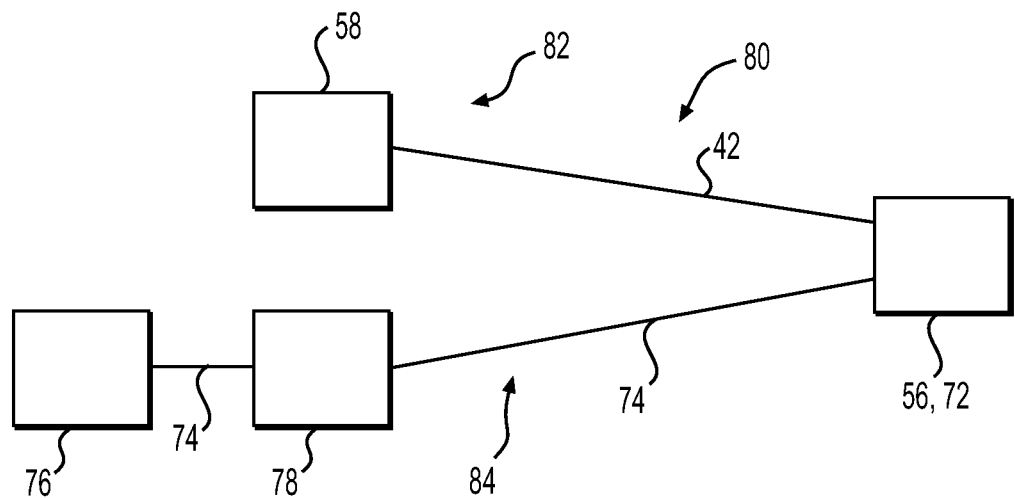
FIG. 9 is a graphical representation of a fourth embodiment of the viewing device of the present invention.

FIG. 9 is a graphical illustration of a fourth contemplated embodiment of the present invention. Here, the viewing device 80 combines aspects of the viewing device 38 and the viewing device 70.

The viewing device 80 includes a passive portion 82 and a powered portion 84 (also referred to as an active portion 84). The passive portion 82 includes a distal lens housing 56 and a proximal lens housing 58 as in the embodiment illustrated in FIG. 3, for example. The distal lens housing 56 is combined with a camera 72. Light from the area exterior to the door is transmitted via the optical conduit 42 to the proximal lens housing 58 and, thereby, to the observer. An image is simultaneously transmitted from the camera 72, through the connector 74, to the display 76. In this embodiment, therefore, the user may view the area exterior to the door 18 through either of the two available means.

As should be apparent to those skilled in the art, the viewing device 38 is a passive device. What this means is that the viewing device 38 excludes electronic or mechanical components that require external power. Therefore, if the aircraft 10 experiences a loss of power, the viewing device 38 will continue to operate as intended. If the viewing device 38 is powered in any way, it becomes necessary to provide battery back-up so that the viewing device 38 will continue to function in the event of a loss of power in the aircraft 10.

The viewing device 80 that is illustrated in FIG. 9 provides a passive portion 82 that does not require power and a powered portion 84. It is contemplated that the user of the viewing device 80 will rely on the powered portion 84 in most instances. The passive portion 82, however, remains available to the user should the aircraft 10 experience a loss of power.

In view of the foregoing discussion, therefore, the following general definitions apply. The viewing device 38, 66, 70, 80 includes at least one image receiver that captures an image of the area exterior to the door 18 of the aircraft 10. The image receiver is the aperture 44 or camera 72 in the embodiments that are described above. The viewing device 38, 66, 70, 80 also includes at least one image projector. The image projector is the eyepiece 40 or the display 76, as discussed. At least one image conduit connects the image receiver to the image projector. In the embodiments described, the image conduit is the optical conduit 42 or the connector 74. Whether in connection with a passive viewing device (e.g., viewing device 38) or a powered viewing device (e.g., viewing device 70), the viewing devices 38, 66, 70, 80 include at least these common elements. These common elements, therefore, define the broad context of the present invention.

As discussed above, the image receiver is positioned to receive an image of an area exterior to an opaque structure, such as an aircraft door 18. The image receiver views the area exterior to the opaque structure through a viewing angle, such as the viewing angle 50. The image projector is positioned on the interior of the opaque structure so that a person standing adjacent to the image projector may examine the area exterior to the opaque structure.

As also discussed above, the image receiver is positioned at a first predetermined height above a floor in the floor of the interior space. The image projector is positioned at a second predetermined distance above the floor of the interior space. The second predetermined height is above the lateral width W of the fuselage 12. The first predetermined height is below the lateral width W of the fuselage 12. In the illustrated embodiments, the second predetermined height is greater than the first height. Accordingly, the image projector is disposed at a height above the floor that is greater than the height of the image receiver above the floor. The difference between the first predetermined distance and the second predetermined distance is considered to be less than or equal to about 6 feet (182.9 cm). While the image receiver may be below the level of the floor, it is contemplated that both the image receiver and the image projector will be above the level of the floor.

The second predetermined height of the image projector is contemplated to be consistent with eye level for a person standing on the floor. To accommodate a $99^{th}$ percentile male, a $50^{th}$ percentile male, and a $1^{st}$ percentile male, the second predetermined height is established in relation to eye level, as measured from the floor. While any suitable height may be selected for the second predetermined height, it is contemplated that the second predetermined height will be consistent with eye level for a $50^{th}$ percentile male. Such a height is considered suitable for all body types and is also considered to be adequate for a female as well.

As should be apparent from the embodiments described above, the image conduit may conduct one or both of a light image or an electrical signal that may be translated into an image. The image conduit, therefore, is not limited to the optical conduit 42 or to the connector 74, as noted.

Next, it is noted that the present invention is described in connection with a door 18 that permits passenger ingress and egress from the aircraft 10. The present invention, however, may be employed in connection with any type of door (or other structure that opens), such as an emergency exit.

As should be apparent from the foregoing, the viewing device 38, 66, 70, 80 of the present invention is adapted for use on an aircraft 10 so that the image receiver 44, 72 is adapted to receive an image of a predetermined spatial area of an exterior of the aircraft 10. The predetermined spatial area is a lateral area. In other words, the predetermined spatial area is lateral to the aircraft 10, specifically exterior to the door 18 of the aircraft 10. As noted above, the image projector 40, 76 is adapted to display the image of the predetermined spatial area. An image conduit 42, 74 connects the image receiver 44, 72 to the image projector 40, 76, thereby conveying the image of the predetermined spatial area from the image receiver 44, 72 to the image projector 40, 76. The image receiver 44, 72 is adapted to be positioned on an exterior side of the aircraft 10 below a lateral width W of a fuselage 12 of the aircraft 10. The image projector 40, 76 is adapted to be positioned on an interior side of the aircraft 10 above the lateral width W of the fuselage 12 of the aircraft 10. The image projector 40, 76 is adapted to be positioned at a predetermined height 46 above the floor 16 on the interior side of the aircraft 10. The predetermined height 46 is consistent with a person's eye level when the person is in an upright position. The image projector 40, 76 is separated from the image receiver 44, 72 by a predetermined distance.

As noted above, the present invention is described in connection with one or more embodiments thereof. The embodiments are intended to be illustrative of the breadth of the present invention. Focus on any one particular embodiment is not intended to be limiting thereof. The present invention, therefore, is intended to encompass variations and equivalents, as would be appreciated by those skilled in the art.

What is claimed is:

1. An aircraft, comprising:
   a fuselage defining a lateral width;
   a door connected to the fuselage at a lower end of the door so as to open in a downward manner along an arc; and
   a viewing device, comprising:
      an image receiver for capturing an image of a predetermined spatial area exterior to the door, the predetermined spatial area being at least partially occupied by the door of the aircraft when the door is in an opened position;
      an image projector to display the image of the predetermined spatial area, the image projector positioned in a vicinity of an interior of the door of the aircraft thereby allowing a person to activate an opening mechanism of the door of the aircraft while viewing the predetermined spatial area through the image projector; and
      an artificial light source to convey light to the predetermined spatial area exterior to the door, the artificial light source being connected to battery back-up power such that the artificial light source is activatable upon a loss of power to the aircraft,
   wherein the viewing device comprises a passive portion and an active portion, the viewing device comprising a distal lens housing combined with a camera, such that the viewing device continues to operate if the aircraft experiences a loss of power.

2. The aircraft of claim 1, wherein the predetermined spatial area is a predetermined, lateral spatial area.

3. The aircraft of claim 1, wherein the image receiver is positioned on an exterior side of the door of the aircraft.

4. The aircraft of claim 1, wherein the image receiver and image projector are passive.

5. The aircraft of claim 4, wherein the image receiver is a light-receiving aperture.

6. The aircraft of claim 4, wherein the image projector is an eye piece.

7. The aircraft of claim 4, wherein an image conduit connects the image receiver and the image projector, wherein the image conduit is an optical conduit.

8. The aircraft of claim 1, wherein the viewing device further comprises an image conduit, and wherein the image receiver, the image projector, and the image conduit are powered.

9. The aircraft of claim 8, wherein the image receiver is a digital camera.

10. The aircraft of claim 8, wherein the image projector is a display.

11. The aircraft of claim 8, wherein the image conduit is an electrical cable.

12. The aircraft of claim 1, wherein the image projector is positioned at a first predetermined height above a floor within the fuselage, the first predetermined height is within a range between about 50 to 80 inches.

13. The aircraft of claim 12, wherein the first predetermined height is within a range between about 55 to 75 inches.

14. The aircraft of claim 13, wherein the first predetermined height in within a range between about 60 to 70 inches.

15. The aircraft of claim 14, wherein the first predetermined height is about 65 inches.

16. The aircraft of claim 1, wherein the image projector is separated from the image receiver bay a first predetermined distance, the first predetermined distance is within a range of less than about 6 feet.

17. The aircraft of claim 16, wherein the first predetermined distance is within a range of less than about 5 feet.

18. The aircraft of claim 17, wherein the first predetermined distance is within a range of less than about 4 feet.

19. The aircraft of claim 18, wherein the first predetermined distance is within a range of less than about 3 feet.

20. The aircraft of claim 19, wherein the first predetermined distance is within a range of less than about 2 feet.

21. The aircraft of claim 20, wherein the first predetermined distance is within a range of less than about 1 foot.

* * * * *